J. R. HALE.
COMBINED LEVER AND WEDGE.
APPLICATION FILED FEB. 4, 1909.

953,138.

Patented Mar. 29, 1910.

WITNESSES
F. C. Fliedner
Nellie B. Keating

INVENTOR
John R. Hale
BY
Francis M. Wright,
ATTORNEY.

UNITED STATES PATENT OFFICE.

JOHN R. HALE, OF MENDOCINO, CALIFORNIA, ASSIGNOR OF FIFTEEN ONE-HUNDREDTHS TO DAVID H. ANTRIM AND THIRTY-THREE ONE-HUNDREDTHS TO JOSEPH HALLIDAY, OF POINT ARENA, CALIFORNIA.

COMBINED LEVER AND WEDGE.

953,138.  Specification of Letters Patent.  Patented Mar. 29, 1910.

Application filed February 4, 1909. Serial No. 476,036.

*To all whom it may concern:*

Be it known that I, JOHN R. HALE, a citizen of the United States, residing at Mendocino city, in the county of Mendocino and State of California, have invented new and useful Improvements in Combined Levers and Wedges, of which the following is a specification.

The present invention relates to an implement especially adapted for raising and moving heavy objects such as logs, and for splitting such objects.

Figure 2:
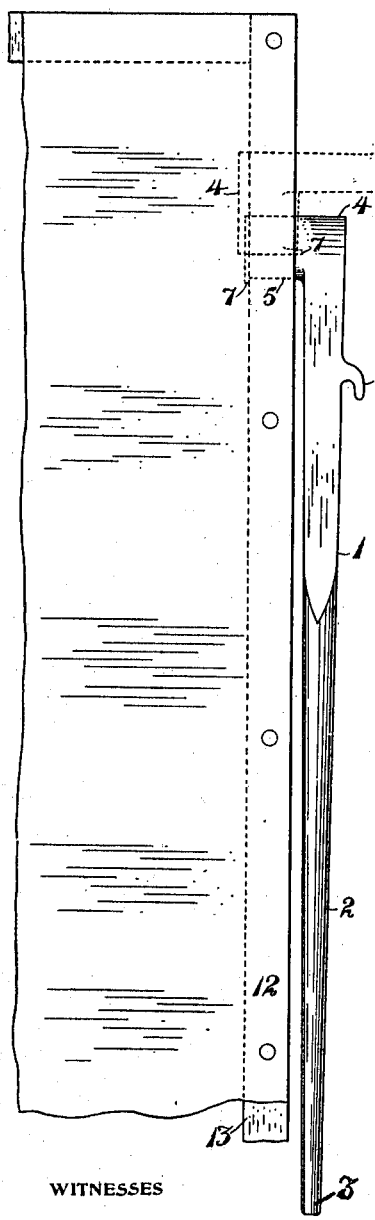
Figure 1:
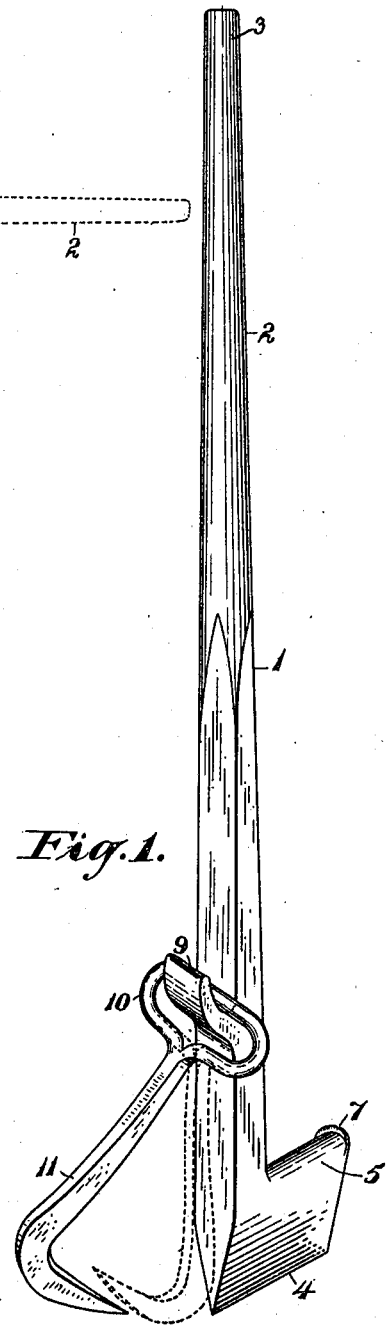

In the drawing, Figure 1 is a perspective view of the invention; Fig. 2 is a side view on a reduced scale showing the invention in use for removing the lid of a box.

Referring to the drawing, 1 indicates a bar, which is straight throughout its length, one end 2 of which is rounded to form a handle, while the other end 3 is substantially square in cross section, the extreme latter end having opposite sides converging to a sharp edge. From said latter end extends laterally an extension 5, the sides of which are continuous with those of said latter end and likewise converge to a sharp edge continuous with the aforesaid edge, as shown at 4, said end and extension thus forming a wedge. The edge of the extension, opposite to the edge 4, is straight, but at its end remote from the bar is formed with a tooth or rib 7. At about one-fourth of the length of the bar from said edge there is formed on one side of the bar, preferably on the side opposite to the extension 5, a hook 9 extending in a direction away from the edge 4, which hook 9 is adapted to engage a hand loop 10 of a hand hook 11.

This device may be advantageously used in many ways. By attaching the hand hook 11 to the bar hook 9, so that the point of the hand hook is directed toward the bar, as shown in full lines in Fig. 1, the device may be used in the same manner as an ordinary canthook for moving logs. If the hand hook be reversed so that its point is directed away from the bar, as shown in dotted lines in Fig. 1, then the device may be used in a manner in which the ordinary cant hook cannot be applied, namely, to drag an object along the ground by first inserting the point of the hand hook below the object, and then pulling on the other end of the bar. When so connected, it may also be advantageously employed in raising an object from the ground. The loop of the hand hook may also be passed over the other end of the bar and moved upon the same as far as it will go, and the device may then be advantageously employed as a lever for raising heavy pieces of scantling or other timber, which it would be impossible to raise directly. It is also more convenient in use than the ordinary canthook in many respects and particularly for the reason that, with the ordinary cant-hook, in which the hook is permanently attached to the lever, it is sometimes difficult to cause the hook to properly engage the timber. With my invention the lumberman can swing the hook detached from the bar, so as to obtain a good penetration of the lumber, and, when the hook is thus in position, can pass the bar hook through the loop 10 and then use the device as a canthook. Also, the hand hook, being detachable from the bar, can in many cases be used advantageously by itself where the canthook could not be employed, as it furnishes a handy and convenient means for seizing hold of, and drawing or moving, heavy objects, such as wood or lumber. Again, since the hand hook is detachable from the bar, said bar can be advantageously used alone in many ways. The sharp edge 4 can be inserted beneath an object as, for instance, a piece of lumber, or a heavy stone or rock, and a great leverage obtained by means of the long handle 2. Or said sharp edge may be inserted in a vertical position in a crack in stone in a quarry, and the stone by means of the lever, readily pried away from the main body. The lateral extension 5 itself forms a hook at the lower end of the bar by which great leverage can be obtained, and, when used in this manner, the tooth or rib 7 enables said extension to obtain a firm hold of the object to be moved.

The device is of great value in extracting stumps, as the sharp edge 4 permits of the roots being readily severed, the earth can be excavated thereby, and the bar can not only be used as a powerful lever to raise or break off the roots, but the hand hook can also be attached, to point either to or from the bar, and, in either position, a great leverage is obtained to loosen or extract the stump.

The form of the bar renders it of great utility for splitting timber or for separating boards which have been nailed together, as, for instance, for opening boxes. The method of use for this purpose is illustrated in Fig. 2. First, as shown in dotted lines, the sharp edge 4 of the bar is inserted in the split or between the two pieces 12, 13, of board to be separated, and then the bar is turned through a right angle in its own plane into the position shown in full lines, so that the upper thick portion of the wedge penetrates between the two boards or other parts to be separated. If, when in this position, the bar be raised from the plane of its former movement a powerful leverage is obtained.

I claim:—

1. An implement of the character described, consisting of a bar straight throughout its length, one end of which is rounded to form a handle, the other end being substantially square in cross section, the extreme latter end having opposite sides converging to a sharp edge, a lateral extension from said latter end, the sides of said extension being continuous with those of said end, and likewise converging to a sharp edge continuous with the aforesaid edge, said end and extension thus forming a wedge, and the edge of the extension opposite to said sharp edge being substantially straight, substantially as described.

2. An implement of the character described, consisting of a bar straight throughout its length, one end of which is rounded to form a handle, the other end being substantially square in cross section, the extreme latter end having opposite sides converging to a sharp edge, a lateral extension from said latter end, the sides of said extension being continuous with those of said end, and likewise converging to a sharp edge continuous with the aforesaid edge, said end and extension thus forming a wedge, and the edge of the extension opposite to said sharp edge being substantially straight, and formed at its extreme end remote from the bar with a rib, substantially as described.

In testimony whereof I have hereunto set my hand in the presence of two subscribing witnesses.

JOHN R. HALE.

Witnesses:
FRANCIS M. WRIGHT,
D. B. RICHARDS.